US011029814B1

(12) United States Patent
Kidani et al.

(10) Patent No.: US 11,029,814 B1
(45) Date of Patent: *Jun. 8, 2021

(54) VISUALIZATION OF A MACHINE LEARNING CONFIDENCE SCORE AND RATIONALE

(71) Applicant: Bottomline Technologies (de) Inc., Portsmouth, NH (US)

(72) Inventors: Flora Kidani, Wilton, CT (US); John Canneto, Rye, NY (US); Anne Baron, Ansonia, CT (US); Jonathan Hewitt, Exeter, NH (US); William Cashman, Durham, NH (US); Michael Marcinelli, North Andover, MA (US)

(73) Assignee: Bottomline Technologies Inc., Portsmouth, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/919,580

(22) Filed: Jul. 2, 2020

Related U.S. Application Data

(63) Continuation of application No. 16/299,227, filed on Mar. 12, 2019, now Pat. No. 10,732,789.

(51) Int. Cl.
| | | |
|---|---|---|
| *G06F 3/0481* | (2013.01) | |
| *G06N 20/00* | (2019.01) | |
| *G06F 40/205* | (2020.01) | |
| *G06F 3/0482* | (2013.01) | |

(52) U.S. Cl.
CPC ........ *G06F 3/04817* (2013.01); *G06F 3/0482* (2013.01); *G06F 40/205* (2020.01); *G06N 20/00* (2019.01)

(58) Field of Classification Search
CPC .................................................. G06F 3/04817
See application file for complete search history.

(56) References Cited

U.S. PATENT DOCUMENTS

| | | |
|---|---|---|
| 6,622,128 B1 | 9/2003 | Bedell et al. |
| 6,885,986 B1 | 4/2005 | Heinemann et al. |
| 7,958,023 B1 | 6/2011 | Shibayama |
| 8,744,934 B1 | 6/2014 | McCrea |

(Continued)

FOREIGN PATENT DOCUMENTS

| | | |
|---|---|---|
| CN | 104809171 A | 7/2015 |
| DM | 086083 | 2/2015 |

OTHER PUBLICATIONS

Ambrogi, Robert, Wolters Kluwer Brings Machine Learning to Legal Invoice Analysis, LawSites blog, Mar. 29, 2017, found at https://www.lawsitesblog.com/2017/03/wolters-kluwer-brings-machine-learning-legal-invoice-analysis.html on Jan. 22, 2019.

(Continued)

*Primary Examiner* — Daniel Rodriguez
(74) *Attorney, Agent, or Firm* — Richard A. Baker, Jr.

(57) ABSTRACT

A unique user interface for improving machine learning algorithms is described herein. The user interface comprises an icon with multiple visual indicators displaying the machine learning confidence score. When a mouse hovers over the icon, a set of icons are displayed to accept the teaching user's input. In addition, the words that drove the machine learning confidence score are highlighted with formatting so that the teaching user can understand what drove the machine learning confidence score.

20 Claims, 6 Drawing Sheets

(56) References Cited

U.S. PATENT DOCUMENTS

| | | | |
|---|---|---|---|
| 8,898,595 B2 | 11/2014 | Cragun | |
| D800,160 S | 10/2017 | Shaw | |
| 10,133,791 B1* | 11/2018 | Chan | G06F 16/2465 |
| 10,438,264 B1* | 10/2019 | Viswanathan | G06F 16/252 |
| 2001/0034675 A1 | 10/2001 | Belford et al. | |
| 2002/0002535 A1 | 1/2002 | Kitchen et al. | |
| 2002/0052894 A1* | 5/2002 | Bourdoncle | G06F 16/954 |
| | | | 715/202 |
| 2003/0033226 A1 | 2/2003 | Anderson | |
| 2003/0110103 A1 | 6/2003 | Sessek et al. | |
| 2003/0195844 A1 | 10/2003 | Hogan | |
| 2004/0064389 A1 | 4/2004 | Force et al. | |
| 2005/0138631 A1 | 6/2005 | Bellotti et al. | |
| 2006/0059021 A1* | 3/2006 | Yulman | G06Q 40/08 |
| | | | 705/4 |
| 2007/0022072 A1* | 1/2007 | Kao | G06F 16/345 |
| | | | 706/45 |
| 2007/0088641 A1 | 4/2007 | Arron et al. | |
| 2007/0214068 A1 | 9/2007 | Tadepalli et al. | |
| 2008/0010605 A1* | 1/2008 | Frank | G06F 16/38 |
| | | | 715/765 |
| 2008/0086413 A1 | 4/2008 | Malloy et al. | |
| 2008/0141126 A1* | 6/2008 | Johnson | G06F 40/106 |
| | | | 715/273 |
| 2008/0255972 A1 | 10/2008 | Ulrich et al. | |
| 2008/0282153 A1* | 11/2008 | Kindeberg | G06F 40/253 |
| | | | 715/256 |
| 2009/0326989 A1* | 12/2009 | Schmitt | G06Q 40/02 |
| | | | 705/4 |
| 2010/0057725 A1* | 3/2010 | Matsumura | G06F 16/00 |
| | | | 707/E17.017 |
| 2010/0205525 A1* | 8/2010 | Konrad | G06F 16/353 |
| | | | 715/256 |
| 2010/0211486 A1 | 8/2010 | Abrashkin et al. | |
| 2011/0010278 A1 | 1/2011 | Bulman et al. | |
| 2011/0035451 A1* | 2/2011 | Smith | G06Q 10/107 |
| | | | 709/206 |
| 2011/0196768 A1 | 8/2011 | Ulrich et al. | |
| 2012/0185401 A1 | 7/2012 | Marusyk | |
| 2013/0117167 A1 | 5/2013 | Iyer et al. | |
| 2013/0159277 A1* | 6/2013 | Liu | G06F 40/211 |
| | | | 707/709 |
| 2014/0201296 A1* | 7/2014 | Patfield | G06Q 10/10 |
| | | | 709/206 |
| 2014/0223284 A1* | 8/2014 | Rankin, Jr. | G06F 40/186 |
| | | | 715/234 |
| 2015/0113388 A1* | 4/2015 | Barrett | G06F 16/35 |
| | | | 715/249 |
| 2015/0324342 A1* | 11/2015 | Chin | G06F 16/9535 |
| | | | 715/231 |
| 2015/0348551 A1* | 12/2015 | Gruber | G06F 40/205 |
| | | | 704/235 |
| 2015/0370760 A1* | 12/2015 | Tigchelaar | G06F 40/106 |
| | | | 715/269 |
| 2016/0012044 A1* | 1/2016 | Franceschini | G06F 16/3344 |
| | | | 707/722 |
| 2016/0063425 A1* | 3/2016 | Fettig | G06Q 10/06393 |
| | | | 705/7.39 |
| 2016/0140529 A1 | 5/2016 | Shaaban et al. | |
| 2016/0314547 A1* | 10/2016 | Carothers | G06Q 50/18 |
| 2017/0199803 A1* | 7/2017 | Bagal | G06F 11/3692 |
| 2017/0278132 A1* | 9/2017 | Dennett | G06Q 30/0253 |
| 2017/0293951 A1* | 10/2017 | Nolan | G06N 20/00 |
| 2018/0144421 A1* | 5/2018 | Williams | G06F 16/3344 |
| 2018/0225851 A1 | 8/2018 | Liu | |
| 2018/0351999 A1* | 12/2018 | Barday | H04L 63/04 |
| 2019/0139147 A1* | 5/2019 | Mittal | G06Q 40/12 |
| 2019/0370601 A1* | 12/2019 | Anil Kumar | G06F 16/2465 |
| 2020/0065383 A1* | 2/2020 | Hadi | G06F 40/205 |
| 2020/0089887 A1* | 3/2020 | Luthra | G06F 21/554 |

OTHER PUBLICATIONS

Hernandez, Gabrielle Orum, Inside Wolters Kluwer's Take on Machine Learning in E-Billing, Law.com blog, Apr. 9, 2017, found at https://www.law.com/2017/04/09/inside-wolters-kluwers-take-on-machine-learning-in-e-billing/? slreturn=20190022143039 on Jan. 22, 2019.

Legal Bill Review Reimagined, Wolters Kluwer website, found at https://www.wkelmsolutions.com/legalview-billanalyzer-savings-calculator on Jan. 22, 2019.

AI-powered IBM Outside Counsel Insights is here to help save insurance companies millions, IBM video and website found at https://mediacenter.ibm.com/media/AIpowered+IBM+Outside+Counsel+Insights+is+here+to+help+sa%20ve+insurance+companies+millions/1_56hk70vq on Feb. 10, 2019.

"Identify a list of items using Natural Language Processing", StackOverflow, May 2017, web page found at https://stackoverflow.com/questions/44112675/identify-a-list-of-items-using-natural-language-processing on Nov. 27, 2018.

Marco Tulio Ribeiro, Sameer Singh, Carlos Guestrin, ""Why Should I Trust You?": Explaining the Predictions of Any Classifier", 2016, arXiv:1602.04938 [cs.LG].

Lime source code, downloaded from https://github.com/marcotcr/lime on Apr. 21, 2020.

Amrit, Chintan, et al, "Identifying child abuse through text mining and machine learning", Expert Systems With Applications 88(2017), pp. 402-418, available at https://www.sciencedirect.com/science/article/pii/S0957417304529.

* cited by examiner

| 101 | | | | | | | |
|---|---|---|---|---|---|---|---|
| Date | TK | Item Type | Narrative | | Units | Rate | Amount |
| 05/01/2016 | RJW | Fee | Prepare and server interrogatories and sun Lorem ipsum dolor sit amet, consectetur adi- sicing elit, sed do eiusmod tempor incididunt ut labore et dolore magna aliqua. | | 0.10 | 80.0000 | 1000.00 |
| 05/01/2016 | LP | Fee | Prepare and server interrogatories and sun Lorem ipsum dolor sit amet, consectetur adi- sicing elit, sed do eiusmod tempor incididunt ut labore et dolore magna aliqua. | | 0.80 | 80.0000 | 1000.00 |
| Adjust | | Dropdown | Rate Deviation | Category Non-billable Over...Overtime charges | -0.10 | -175.0000 | -175.00 |
| 05/01/2016 | RJW | Fee | Prepare correspondence to adjuster, John Doe, regarding records review invoice from Dr. Smith, in furtherance of defense strategy. | | 40.00 | 100.0000 | 1000.00 |
| 05/01/2016 | LP | Fee | Prepare and server interrogatories and sun Lorem ipsum dolor sit amet, consectetur adi- sicing elit, sed do eiusmod tempor incididunt ut labore et dolore magna aliqua. | | 40.00 | 140.0000 | 1000.00 |
| Revert | | Dropdown | Rate Deviation | Category Non-billable Over...Overtime charges | -0.10 | -175.0000 | -175.00 |
| | | Dropdown | Rate Deviation | Category Non-billable Over...Overtime charges | 10.00 | 200.0000 | 1000.00 |
| 05/01/2016 | LP | Fee | Prepare and server interrogatories and sun Lorem ipsum dolor sit amet, consectetur adi- sicing elit, sed do eiusmod tempor incididunt ut labore et dolore magna aliqua. | | 10.00 | 200.0000 | 1000.00 |
| Revert | | | | | | | |
| 05/01/2016 | LP | Fee | Prepare and server interrogatories and sun Lorem ipsum dolor sit amet. Prepare and server interrogatories and sun Lorem ipsum dolor sit amet. | | 40.00 | 140.0000 | 1000.00 |
| Revert | | Dropdown | Rate Deviation | Category Non-billable Over...Overtime charges | -0.10 | -175.0000 | -175.00 |

*Figure 1*

| Item Type | Narrative | | Units | Rate | Amount |
|---|---|---|---|---|---|
| Fee | Prepare and server interrogatories and sun Lorem ipsum dolor sit amet, consectetur adi- sicing elit, sed do eiusmod tempor incididunt ut labore et dolore magna aliqua. | 🔍 | 0.10 | 80.0000 | 1000.00 |
| Fee | Prepare and server interrogatories and sun Lorem ipsum dolor sit amet, consectetur adi- sicing elit, sed do eiusmod tempor incididunt ut labore et dolore magna aliqua. | | 0.80 | 80.0000 | 1000.00 |
| Dropdown Rate Deviation  Category  Non-billable Over.. Overtime charges | | | -0.10 | -175.0000 | -175.00 |
| Fee | Prepare correspondence to adjuster, John Doe, regarding records review invoice from Dr. Smith, in furtherance of defense strategy | | 40.00 | 100.0000 | 1000.00 |
| Fee | Prepare and server interrogatories and sun Lorem ipsum dolor sit amet, consectetur adi- sicing elit, sed do eiusmod tempor incididunt ut labore et dolore magna aliqua. | | 40.00 | 140.0000 | 1000.00 |
| Dropdown Rate Deviation  Category  Non-billable Over.. Overtime charges | | | -0.10 | -175.0000 | -175.00 |
| Fee | Prepare and server interrogatories and sun Lorem ipsum dolor sit amet, consectetur adi- sicing elit, sed do eiusmod tempor incididunt ut labore et dolore magna aliqua. | | 10.00 | 140.0000 | 1000.00 |
| Dropdown Rate Deviation  Category  Non-billable Over.. Overtime charges | | | | | -175.00 |
| Dropdown Rate Deviation  Category  Non-billable Over.. Overtime charges | | | | | |
| Fee | Prepare and server interrogatories and sun Lorem ipsum dolor sit amet, consectetur adi- sicing elit, sed do eiusmod tempor incididunt ut labore et dolore magna aliqua. | 🔍 | 10.00 | 200.0000 | 1000.00 |

*Figure 2*

| Item Type | Narrative | | | | Units | Rate | Amount |
|---|---|---|---|---|---|---|---|
| Fee | Prepare and server interrogatories and sun Lorem ipsum dolor sit amet, consectetur adi- sicing elit, sed do eiusmod tempor incididunt ut labore et dolore magna aliqua. | | | | 0.10 | 80.0000 | 1000.00 |
| Fee | Prepare and server interrogatories and sun Lorem ipsum dolor sit amet, consectetur adi- sicing elit, sed do eiusmod tempor incididunt ut labore et dolore magna aliqua. | | | | 0.00 | 80.0000 | 1000.00 |
| Dropdown | Rate Deviation | Category | Non-billable Over…Overtime charges | | -0.10 | -175.0000 | -175.00 |
| Fee | Prepare correspondence to adjuster, John Doe, regarding records review invoice from Dr. Smith, in furtherance of defense strategy. | | | | 40.00 | 100.0000 | 1000.00 |
| Fee | Prepare and server interrogatories and sun Lorem ipsum dolor sit amet, consectetur adi- sicing elit, sed do eiusmod tempor incididunt ut labore et dolore magna aliqua. | | | | 40.00 | 140.0000 | 1000.00 |
| Dropdown | Rate Deviation | Category | Non-billable Over…Overtime charges | | -0.10 | -175.0000 | -175.00 |
| Fee | Prepare and server interrogatories and sun Lorem ipsum dolor sit amet, consectetur adi- sicing elit, sed do eiusmod tempor incididunt ut labore et dolore magna aliqua. | | | | 10.00 | 140.0000 | 1000.00 |
| Dropdown | Rate Deviation | Category | Non-billable Over…Overtime charges | | | | -175.00 |
| Dropdown | Rate Deviation | Category | Non-billable Over…Overtime charges | | | | |
| Fee | Prepare and server interrogatories and sun Lorem ipsum dolor sit amet, consectetur adi- sicing elit, sed do eiusmod tempor incididunt ut labore et dolore magna aliqua. | | | | 10.00 | 200.0000 | 1000.00 |

VISUALIZATION OF A MACHINE LEARNING CONFIDENCE SCORE AND RATIONALE

PRIOR APPLICATION

This application is a continuation of U.S. patent application Ser. No. 16/299,227, "Machine Learning Visualization", filed on Mar. 12, 2019, said application incorporated herein by reference. This application is also related to two design patent applications, US Design Patent Application 29/678,877, "A Light Bulb Indicator of a Machine Learning Confidence Score", filed on Jan. 31, 2019 and US Design Patent Application 29/678,886, "A User Interface for Collecting Machine Learning Feedback", filed on Jan. 31, 2019. Both Applications are hereby incorporated by reference.

BACKGROUND

Technical Field

The system, apparatuses and methods described herein generally relate to machine learning visualization, and, in particular, to visual techniques for displaying a machine learning confidence score and reasoning on a display screen.

Description of the Related Art

The name machine learning was coined in 1959 by Arthur Samuel. Tom M. Mitchell provided a widely quoted, more formal definition of the algorithms studied in the machine learning field: "A computer program is said to learn from experience E with respect to some class of tasks T and performance measure P if its performance at tasks in T, as measured by P, improves with experience E." This definition of the tasks in which machine learning is concerned offers a fundamentally operational definition rather than defining the field in cognitive terms.

Machine learning tasks are classified into several broad categories. In supervised learning, the algorithm builds a mathematical model of a set of data that contains both the inputs and the desired outputs. For example, if the task were determining whether an image contained a certain object, the training data for a supervised learning algorithm would include images with and without that object (the input), and each image would have a label (the output) designating whether it contained the object. In special cases, the input may be only partially available, or restricted to special feedback. Semi-supervised learning algorithms develop mathematical models from incomplete training data, where a portion of the sample inputs are missing the desired output.

Machine learning implementations have two different modes, one for the operation of the algorithms and another for the leaning aspect. In a supervised machine learning implementation, both the learning from training data and the actual supervised operation require that the data be specified as true or false as to the specific criteria. For instance, in the field of legal spend management, supervised machine learning is used to review legal invoices to see if the item billed fits within a set of billing criteria. If the invoice item fits within the criteria, the item is allowed. Otherwise, the invoice item is rejected. A machine learning algorithm will parse the invoice item and match certain words against a model developed by the machine learning engine. The invoice is then displayed to a user to validate the machines determination.

While some machine learning, Amazon storefront for example, incorporates feedback into its user interface by taking what you buy or search for and outputting similar products as suggestions, other machine learning tasks incorporate a simple agree/disagree user interface. But neither interface provides an explanation of why the machine made its determination. There is a strong need in the industry to improve the communications from the machine to the supervising user as to why a determination is made, and to provide an easy, intuitive means for the supervising user to provide feedback to the machine.

The present inventions address these issues.

BRIEF SUMMARY OF THE INVENTION

A special purpose computer implemented method of visualizing a machine learning confidence score is described herein. The method is made up of the steps of processing a textual description through a machine learning model to derive the machine learning confidence score. The machine learning model uses natural language processing to convert the textual description into word stems that are used by the machine learning model to calculate the machine learning confidence score. Once the confidence score is determined, the algorithm then searches the textual description for word stems that comprised a highest impact in the confidence score. Formatting instructions are added in the textual description to at least one word associated with the word stems that comprised the highest impact on the confidence score. The textual description with the formatting instructions to indicate reasoning used by the machine learning model in the determination of the machine learning confidence score are then displayed on a display screen, and input from a user correcting the machine learning confidence score is accepted, the input used to teach the machine learning model.

The method may use the textual description from a legal invoice, a medical invoice, or another document. A variable icon could be displayed on the display screen to graphically indicate the machine learning confidence score. The variable icon could display a different number of items depending upon the magnitude of the confidence score; in some embodiments the variable icon displays three rays off of a lightbulb based on one range of the confidence score, and one ray off of the lightbulb based on another range of the confidence score. The variable icon could change once the input from the user is accepted. The user input could modify the machine learning model in real time.

An apparatus for the visualization of a machine learning confidence score is also described herein. The apparatus is made up of a display screen, a special purpose computer electrically connected to the display screen, and a large capacity data storage facility with a machine learning training data set. The apparatus further includes a user interface display module operating on the special purpose computer and displaying an indication of the confidence score on the display screen; a natural language processing module operating on the special purpose computer and interfacing with the user interface display module to convert a textual description into a table of word stems; a machine learning module operating on the special purpose computer and interfacing with the natural language processing module to convert the table of word stems into a confidence score using a machine learning model built using the machine learning training data set; a scan back module operating on the special purpose computer and interfacing to the machine learning module to insert formatting instructions into the textual description using the table of stems to format at least one word in the textual description that impacted the confidence score; and a user interface input module operating on the special purpose computer and interfacing with the scan back module to display the textual description with the formatting instructions and to accept user input regarding the confidence score and to add the user input to the machine learning training data set.

The apparatus may use the textual description from a legal invoice, a medical invoice, or another document. The indication of the confidence score on the display screen could be in the form of a variable icon that varies depending on the magnitude of the confidence score. The variable icon could display a different number of items depending upon the magnitude of the confidence score; in some embodiments the variable icon displays three rays off of a lightbulb based on one range of the confidence score, and one ray off of the lightbulb based on another range of the confidence score. The user input could modify the machine learning model in real time.

A system for the visualization of a machine learning confidence score is also described herein. The system is made up of a display screen on a personal computing device and a special purpose computer electrically connected to the personal computing device through a network and to a large capacity data storage facility with a machine learning training data set. The system also includes a user interface display module operating on the personal computing device and displaying the confidence score on the display screen in the form of a variable icon that varies depending on the magnitude of the confidence score; and a natural language processing module operating on the special purpose computer to convert a textual description into a table of word stems. In addition, the system includes a machine learning module operating on the special purpose computer and interfacing with the natural language processing module to convert the table of word stems into a confidence score using a machine learning model built using the machine learning training data set; a scan back module operating on the special purpose computer and interfacing to the machine learning module to insert formatting instructions into the textual description using the confidence score and the table of stems to format at least one word in the textual description that impacted the confidence score; and a user interface input module operating on the personal computing device and interfacing with the scan back module through the network to display the textual description with the formatting instructions and to accept user input regarding the confidence score and sending the user input to the special purpose computer to add the user input to the machine learning training data set.

The system may use the textual description from a legal invoice or other document. The variable icon could display a different number of items depending upon the magnitude of the confidence score; in some embodiments the variable icon displays three rays off of a lightbulb based on one range of the confidence score, and one ray off of the lightbulb based on another range of the confidence score. The variable icon could change once the input from the user is accepted. The user input could modify the machine learning model in real time.

A special purpose computer implemented method of visualizing a machine learning confidence score is recited herein. The method comprises (1) determining the machine learning confidence score on an invoice, (2) displaying an indication of the machine learning confidence score on a display screen along with the narrative section, (3) detecting a user input, (4) changing the indication of the machine learning confidence score based on the user input; and (5) displaying the word cloud. The (1) determining of the machine learning confidence score comprises (1a) parsing a narrative section of the invoice into a table of words, (1b) converting the words in the table of into stems, (1c) looking up each stem in a machine learning model, (1d) placing a weight for the stem, as found in the machine learning model, in the table of the words, (1e) determining a confidence score by averaging the weights for each word in the table of the words; and looking through the narrative section and changing formatting of the words based on a relative weight in the table of the words to create a word cloud.

The formatting could be a bold format, color format, and/or font size. The user input could be a mouse-over and/or a touch on a touch screen. The changing of the indication of the confidence score could display a thumb icon (the thumb icon could be a thumb up icon). The method could further include (6) accepting a user indication of the acceptance of the confidence score, and possibly (7) changing the display screen to reflect that the confidence score has been accepted.

An apparatus for visualization of a machine learning confidence score is also described herein. The apparatus comprises a display screen; a special purpose computer electrically connected to the display screen; a large capacity data storage facility with a machine learning training data set; a user interface display algorithm operates on the special purpose computer and displays an indication of the machine learning confidence score on the display screen; a natural language processing algorithm operates on the special purpose computer and interfaces with the user interface display algorithm to convert a textual description into a table of word stems; a machine learning algorithm operates on the special purpose computer and interfaces with the natural language processing algorithm to convert the table of the word stems into the machine learning confidence score using a machine learning model built using the machine learning training data set; a scan back algorithm operates on the special purpose computer and interfaces to the machine learning algorithm to insert format instructions into the textual description using the table of word stems to format at least one word in the textual description that impacted the machine learning confidence score; and a user interface input algorithm operates on the special purpose computer and interfaces with the scan back algorithm to display the textual description with the format instructions and to accept user input regarding the machine learning confidence score and to add the user input to the machine learning training data set, wherein the textual description with the format instructions is only displayed on the display screen when a mouse location is over a variable icon that varies depending on a magnitude of the machine learning confidence score.

A special purpose computer implemented method of visualizing a machine learning confidence score is also described here. The method comprises (1) displaying an indication of the machine learning confidence score on a display screen along with a narrative section, (2) detecting that a mouse location is over the indication of the machine learning confidence score on the display screen, (3) changing the indication of the machine learning confidence score based on the mouse over the indication of the machine learning confidence score, and (4) changing formatting of the narrative section based on the mouse over the indication of the machine learning confidence score.

The indication of the machine learning confidence score could be a light bulb icon. The light bulb icon could vary a number of rays with the light bulb icon based on the machine learning confidence score.

BRIEF DESCRIPTION OF THE DRAWINGS

FIG. 1 is a screen shot of a legal invoice with the confidence score indication.

DETAILED DESCRIPTION

There is a strong need in the machine learning industry to provide meaningful information to the supervising user in a way that is intuitive and easy to use. Since the teaching of the machine may include thousands of evaluations from users who have little extra time to train machine models, the easy of rapidly understanding the machine's rational and inputting feedback are critical.

In the field of legal spend management, auditors are hired to review every legal bill sent to an insurance company or other entity to assure that the billing adheres to contractual billing guidelines. This task of reviewing invoices requires trained auditors, often lawyers themselves, performing a tedious task of reading each line of each legal bill for compliance. The reviewers vary in their interpretation due to the personalities of each auditor. In addition, the labor costs of reviewing legal bills is high.

As a result, the legal spend management industry has started to use rule based heuristics and machine learning analysis of legal invoices to lower costs and provide a consistent interpretation. While machine learning provides an improvement over human review and heuristic determinations, in the analysis of the highly variable text in the invoices, supervised machine learning is far from easy to use.

The present inventions provide a user interface that simply presents the machine's determination, both in terms of acceptance or rejection of an invoice item, but also provides an indication of the machine's confidence in the determination.

While the example below uses legal invoices, the present inventions could be applied to medical bills, fleet maintenance bills, or any other type of invoices. Furthermore, any time of supervised machine learning could benefit from the user interface and algorithms described herein. The narrative description 102 could explain the tasks of a lawyer, a court reporter, an independent adjustor, an accountant, and engineer, an expert witness, or any number of other worker.

Looking to FIG. 1, we see a portion of a legal invoice that has been processed by a machine learning model. This portion of the invoice is a table of seven rows, where each row is an individual time card entry. Each entry has a date 101, a narrative 102, an amount 104, and other columns. There are a number of types of analysis that can be performed that are not described herein, for instance assuring that the dates 101 are within a range or that the calculations of the amount 104 are correct.

For purposes of our description in this embodiment, we focus on the narrative 102, but the other columns, or other information on the invoice or even beyond the invoice, may be used without detracting from the inventions herein. The narrative 102 is analyzed to determine if it fits within a criteria. In the first row, the machine believes that the time cards entry in this row should be rejected, but the machine has a low confidence in its determination. This is seen because the light bulb indicator 103 has only one ray lit, indicating a low confidence. The machine's confidence score for this row is determined by the model, as described below. The machine, in its creation of the user interface, has the confidence score within a certain range that indicates a lower confidence.

The second row has no light bulb indicator, indicating that the machine believes that this time card entry is allowable. Technically, this means that the machine learning confidence score is below a threshold. The third row has a light bulb indicator 105 with all rays lit, indicating high confidence that this time card entry should be rejected. The sixth row has a light bulb indicator 107 with two rays lit, indicating medium confidence in the scoring. In one embodiment, the confidence score could have a range from 0 to 100. All confidence scores less than 40 could be determined to be billable, scores from 41-60 could display one ray 103, all confidence scores from 61-80 could display two rays 107, and all scores above 81 could display three rays 105. (The number of rays could be changed without detracting from the inventions herein).

In the fourth row, a partially disallowed time card entry is shown, with $175.00 deducted from this line item 106.

Figure 2:
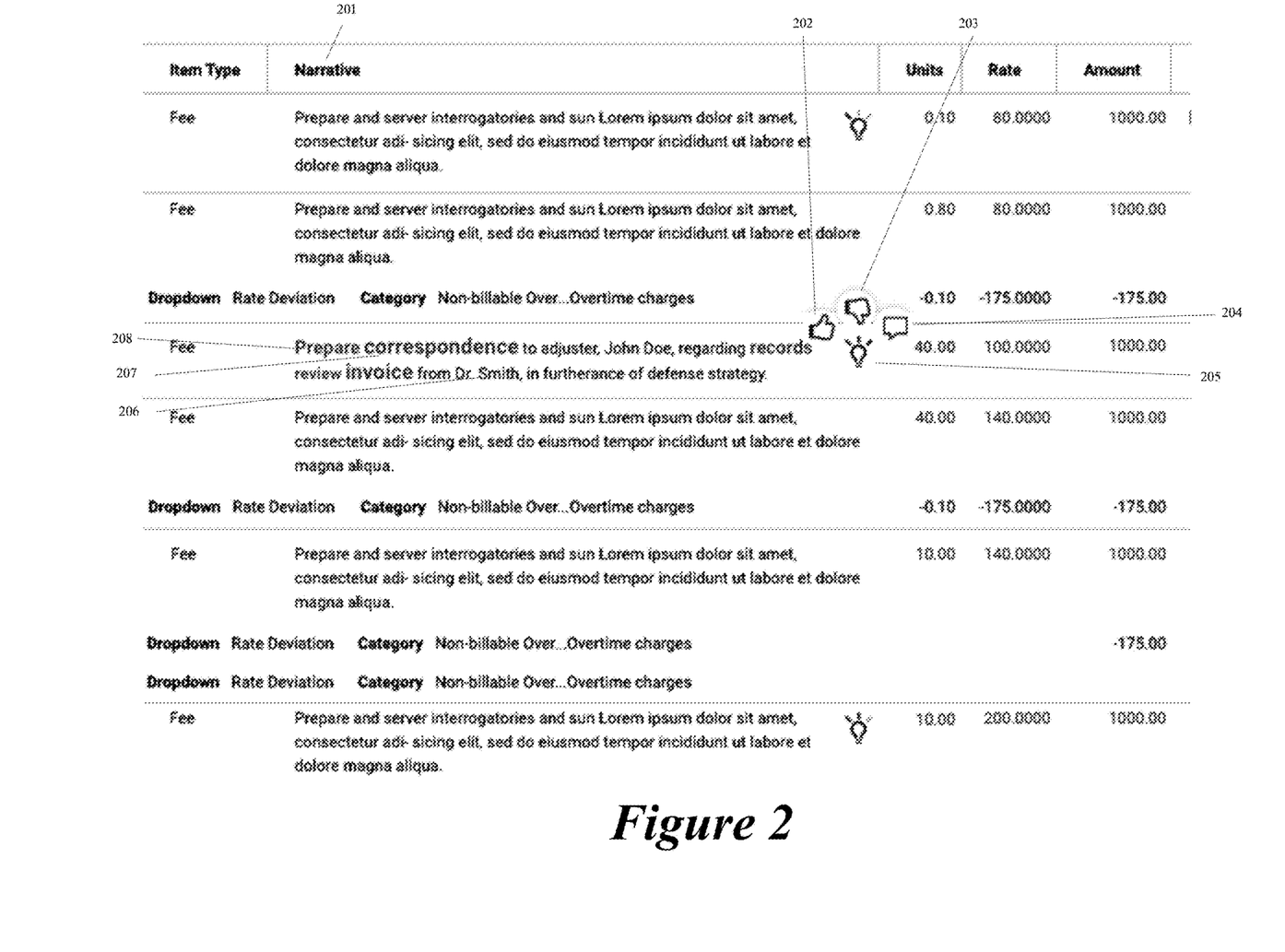
FIG. 2 is a screen shot of a legal invoice with a mouse hovering over the confidence score indication.

FIG. 2 shows the display screen when the mouse hovers over the light bulb icon 205. The mouse over indicates that the user, who is teaching the machine, is focusing on the particular line on of the invoice. Other embodiments could include tracking the user's eyes to determine focus or watching where a finger is hovering on a touch screen. In still another embodiment, every line of the invoice displays as in the third section of FIG. 2.

In this example, the mouse hovers over the light bulb icon 205 and the user interface software detects the mouse over. The software then presents the user with three options to select: a thumbs up icon 202, or a thumbs down icon 203, or a comment icon 204.

If the user selects the thumbs up icon 202, the user is approving of the machine learning decision. The time card entry in the legal invoice for that line is marked as disallowed, and the machine learning algorithm is affirmed. The thumbs up icon 202 may be filled in (or a symbol (dot, for example) inserted into it) to provide feedback to the user that his input has been received. In some embodiments, a separate user interface is provided to allow the user to allow a portion of this time card entry.

If the user selects the thumbs down icon 203, the user is disapproving of the machine learning decision. The time card entry in the legal invoice for that line is marked as allowed, and the machine learning algorithm is notified that the answer is incorrect. The machine learning algorithm can adjust on the fly, or the correction can be batched up for the next run of the model. The thumbs down icon 203 may be filled in (or a symbol (dot, for example) inserted into it) to provide feedback to the user that his input has been received. This is shown in FIG. 3 as item 302.

If the user selects the comment icon 204, the user is allowed to enter comments on the invoice line. The comment icon 204 is filled in (or has a symbol (dot, for example)

inserted into it) to indicate that there is a comment on this item. A second frame or window is presented to the user to collect the comment.

Figure 3:
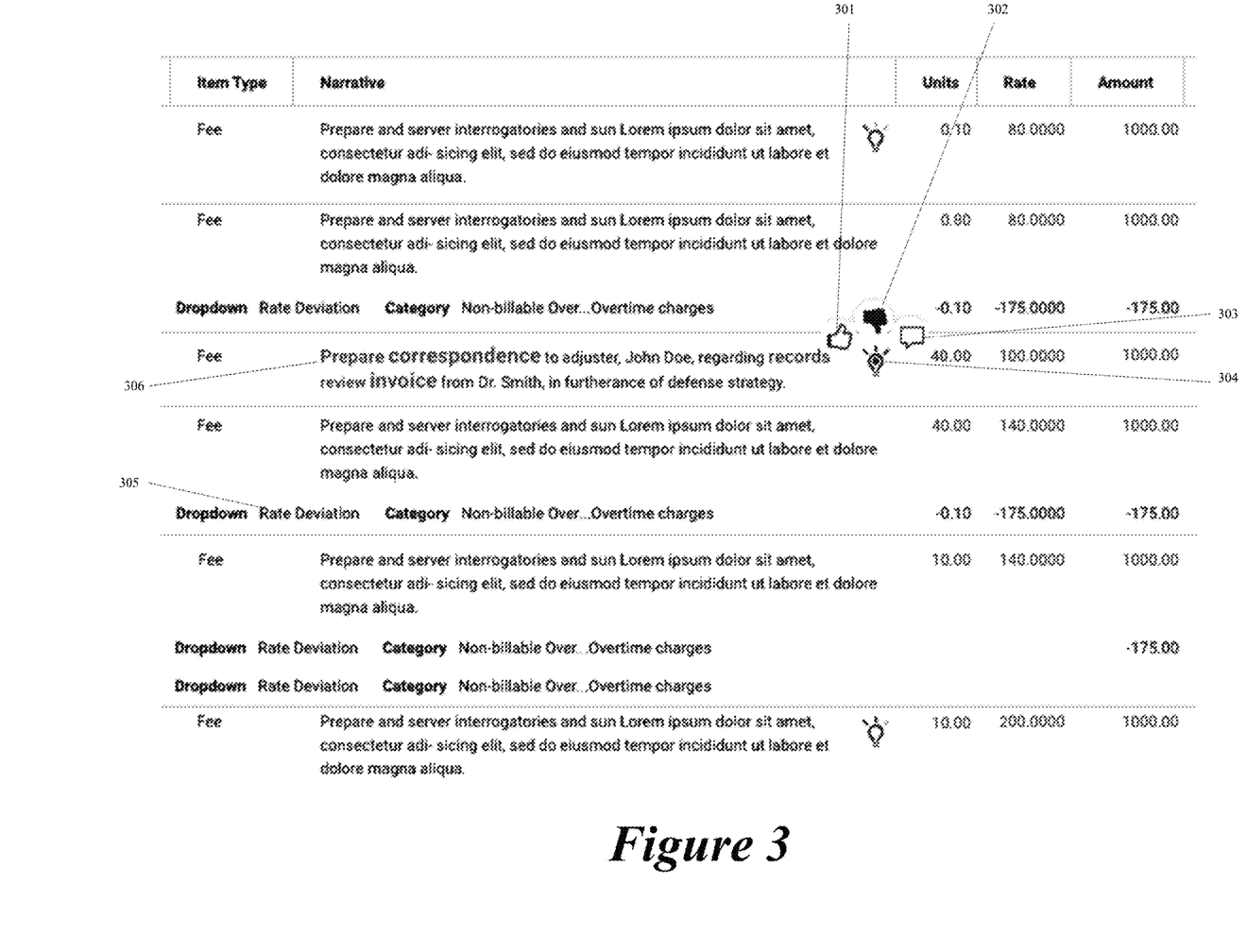
FIG. 3 is a screen shot of a legal invoice with a mouse hovering over the confidence score after the user has approved the machine score.

Once the user has made a selection, a dot is placed in the middle of the light bulb icon 202, as seen in item 304 of FIG. 3. Each time the mouse hovers over the light bulb icon 304 after the user has made a selection, the thumbs up icon 202, thumbs down icon 203, or comment icon 204 will indicate the previous selection by filling in the selected choice (the thumbs down icon 302, for example).

The user has the option, once a selection is made, to select the icon 202, 203, 204 again to remove the selection. In this case, the dot in the lightbulb is removed, in one embodiment. The user may also select the other thumb icon 202, 203 to change the selection.

During the mouse over, the reasoning for the machine learning confidence score is indicated in the narrative 201 column for that line of the invoice 206 by changing the formatting of the words in the narrative. In the present embodiment, the words that drove the confidence score are bolded 207, 208 and the words that are the most important drivers of the confidence score increase their font sizes 207. This allows the user to easily see the machine's reasoning behind the confidence score. This is similar to a teacher requiring a student to show their work as to why they made the choice that they made.

In an alternative embodiment, the words that drive the confidence score could be displayed in a different color, italicized, single and double underlined, or any other user interface indication.

In FIG. 3, we see the display screen with the user deciding to disapprove of the machine's determination of line three of the invoice. The thumbs down icon 302 is filled in and a dot is placed in the middle of the light bulb icon 304 to indicate that the user has made a selection for this item. While the thumb icons 301, 302 and the comment icon 303 will disappear when the mouse is no longer hovering over the light bulb icon 304, the light bulb icon 304 will continue to display the dot in the middle to indicate that the user has graded the machine's determination of this line of the invoice. In other embodiments, the dot in the light bulb icon 304 could be replaced with another type of indication, such as icon color or other visual change in the icon 304.

As in FIG. 2, the narrative line 306 includes a word cloud type indication of the words that drove the machine learning confidence score. In addition, the user may note 305 a partial or full dismissal of the invoice amount for that line item as well as a categorization of the reason for cutting the bill.

Figure 4:
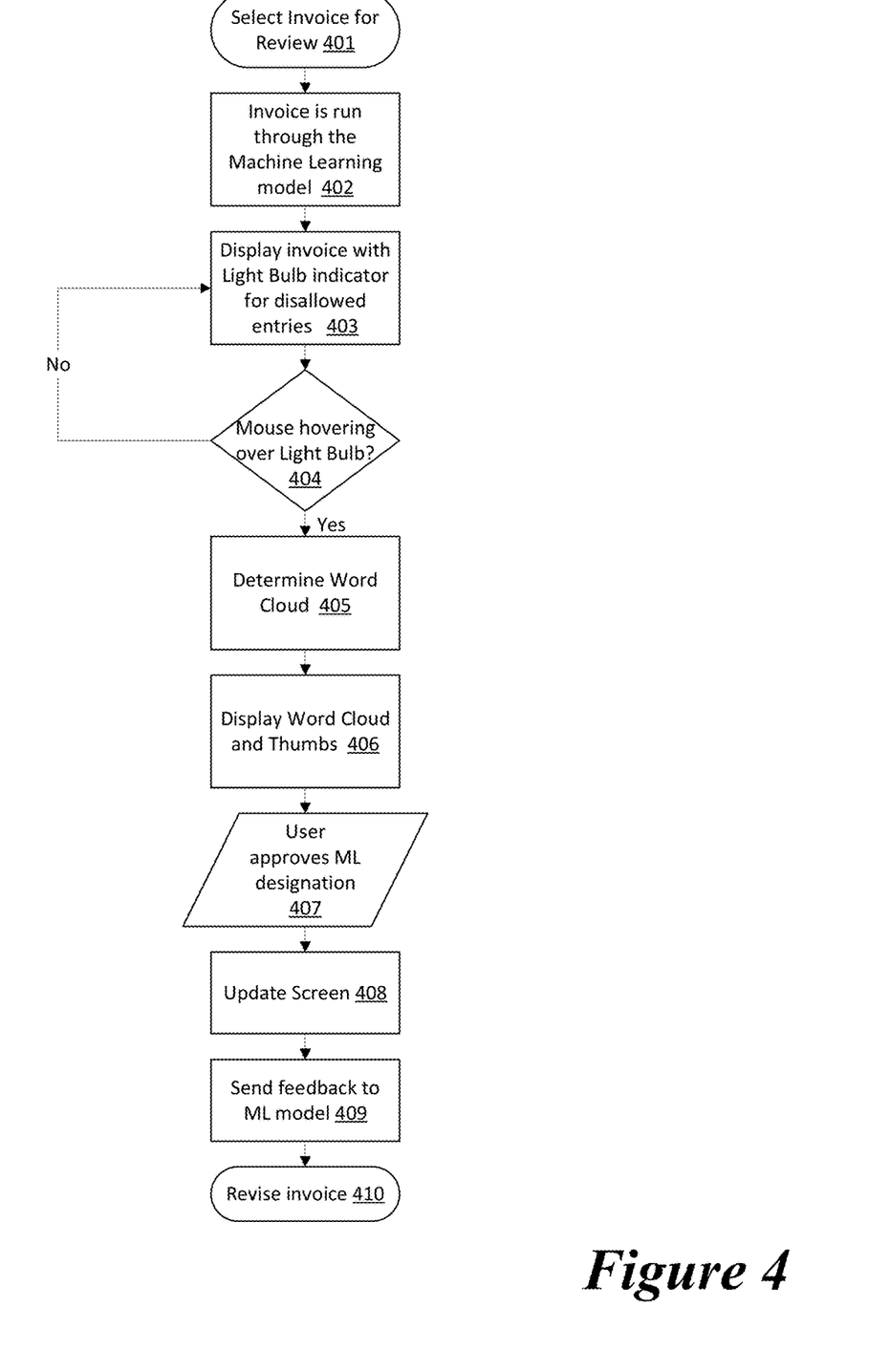
FIG. 4 illustrates a flow chart of the user interface code in one embodiment.

FIG. 4 shows one possible user interface algorithm for implementing the above described user interface. The algorithm begins when the user (or an automaton) selects an invoice to review 401. The invoice is then processed by the machine learning model 402. Each line of the invoice is analyzed to determine a machine learning confidence score for the line. Based on the confidence score, different icons are displayed on the screen to provide the user with information on the machine's determination 403. In one embodiment, the confidence score could have a range from 0 to 100. All confidence scores less than 40 could be determined to be billable, with no icon displayed, scores from 41-60 could display one ray 103, all confidence scores from 61-80 could display two rays 107, and all scores above 81 could display three rays 105. (The number of rays and categories could be changed without detracting from the inventions herein).

The mouse location is then checked by the user interface 404, and if the mouse is over a light bulb icon 103, 105, 107, then the line is processed to indicate details of the reasoning.

The word cloud of the narrative text is determined 405 (see FIG. 5) and displayed 406, replacing the text of the narrative with the narrative text with formatting indicating the reasoning for the machine learning score. The thumbs up icon 202, thumbs down icon 203, and comment icon 204 are also displayed where the mouse is located.

If the mouse moves to another area of the screen, the formatting of the text narrative and thumbs icons 202, 203, 204 will be removed from the screen.

If the user selects one of the thumbs icons 202, 203, 204, the screen will be updated 408 to reflect the choice 407. The selected icon will be filled in (thumbs down icon 302, for example) and a dot will be placed in the light bulb icon 304. The user's teaching indication will then be sent back to the machine learning model 409. The invoice is then revised, if both the machine and the user agree that the billing entry needs to be rejected 410.

In some embodiments, when the invoice is run through the machine learning model 402, a data structure is returned for each line in the invoice with the narrative formatted to indicate the importance of each word in the narrative to the determination of the confidence score. In this scenario, the functionality of 405 is incorporated in 402, and block 406 simply replaces the original narrative with the stored narrative for that time card entry description.

Figure 5:
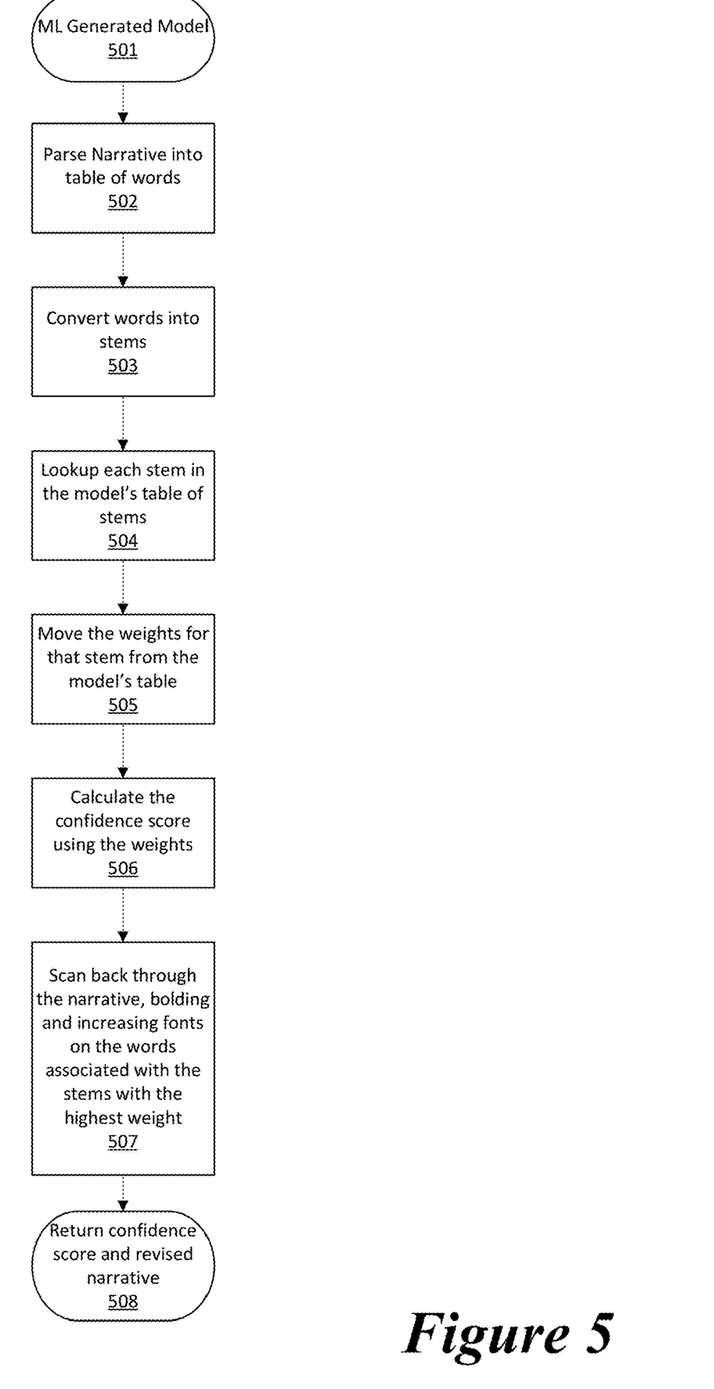
FIG. 5 is a flow chart of machine learning model execution.

FIG. 5 describes one embodiment the operation of the machine learning model for a line of the invoice 501. First, the test of the narrative is parsed into a table of words 502. This could use traditional parsing techniques of searching for delimiters such as spaces, periods, tabs, commas, and other punctuation types. The strings between the delimiters are stored in a table. In some descriptions, this is called tokenization The words in the table are next analyzed to convert the word into its stem by removing parts of speech that are attached to the word, such as plurality 503. Some descriptions call finding this process lemmatization—figuring out the most basic form or lemma of each word in the sentence. For some models, the word is categorized as a noun, verb, adverb, adjective, etc. Steps 502, 503, 504 are often referred to as natural language processing.

Next, each word stem is looked up in the model's database of stems 505, and the corresponding weight of the word in the database is copied into the narrative's table of words. In a simple model, the weights are averaged to create a confidence score 506. More complicated models could use other statistical methods to determine the confidence score. For instance, verbs could be given more weight than adverbs, or a mean could be used rather than an average.

Once the confidence score has been determined, the algorithm model backtracks to format the narrative text according to the impact each word has on the confidence score 507. This is done by looking at the table to see the relative weight of each word. The highest weighted words are identified, and the original text of the narrative is searched for each of these highest weighted words. When the word is found, it is converted to bold format, and the font increased by a factor.

The confidence score and the formatted narrative string are then returned 508.

Figure 6:
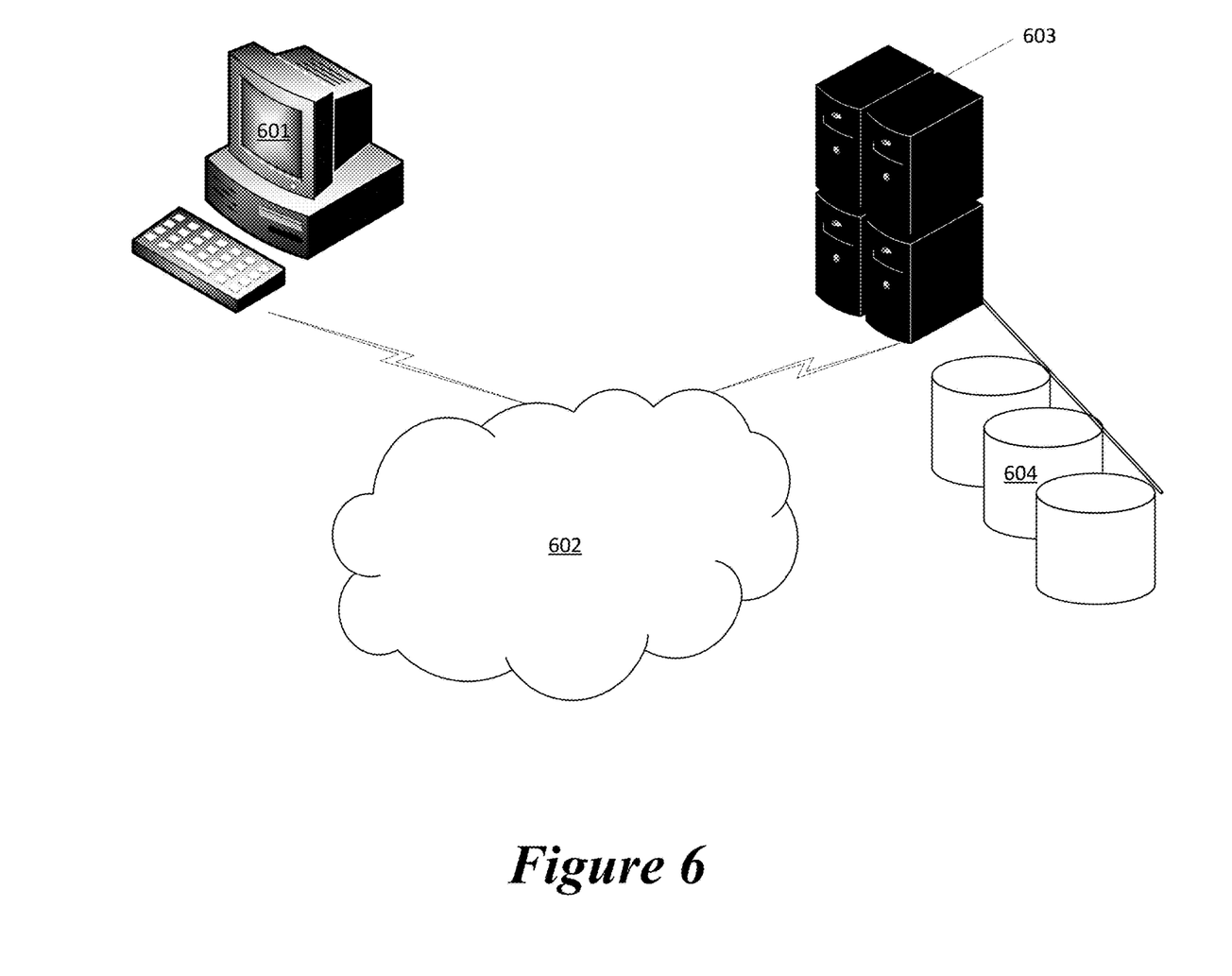
FIG. 6 is an electrical architecture of one embodiment.

Because of the complexities of machine learning algorithms, special purpose computing may be needed to build and execute the machine learning model described herein. FIG. 6 shows one such embodiment. The user views the user interface described here on a personal computing device such as a personal computer, laptop, tablet, smart phone, monitor, or similar device 601. The personal computing device 601 communicated through a network 602 such as the Internet, a local area network, or perhaps through a direct interface to the server 603. The server 603 is a high performance, multi-core computing device with significant storage facilities 604 in order to store the training data for the model. Since this training data is continuously updated through the present inventions, this data must be kept online and accessible so that it can be updated. In addition, the real-time editing of the model as the user provides feedback to the machine learning model 409 requires significant processing power to rebuild the model as feedback is received.

The server 603 is a high performance computing machine electrically connected to the network 602 and to the storage facilities 604.

While the above described embodiment involves machine learning confidence scores, the algorithm could be used with confidence scores using other software techniques. For instance, it is envisioned that a heuristically based algorithm could also be used to analyze the narrative field, and that the word cloud could be formed by inserting formatting into the narrative field at each step in the heuristical algorithm.

The foregoing devices and operations, including their implementation, will be familiar to, and understood by, those having ordinary skill in the art. This algorithm is necessarily rooted in computer technology in order to overcome the problem of displaying machine learning reasoning with a simple interface in order to receive user feedback in the machine's determination of a confidence score.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A special purpose computer implemented method of visualizing a machine learning confidence score, the method comprising:
    determining the machine learning confidence score on an invoice comprising:
    parsing a narrative section of the invoice into a table words;
    converting the words in the table of into stems; looking up each stem in a machine learning model;
    placing a weight for the stem, as found in the machine learning model, in the table of the words;
    determining a confidence score by averaging the weights for each word in the table of the words; and
    looking through the narrative section and changing formatting of the words based on a relative weight in the table of the words to create a word cloud;
    displaying an indication of the machine learning confidence score on a display screen along with the narrative section;
    detecting a user input;
    changing the indication of the machine learning confidence score based on the user input; and
    displaying the word cloud in response to detecting the user input.

2. The method of claim 1 wherein the formatting is a bold format.

3. The method of claim 1 wherein the formatting is a color format.

4. The method of claim 1 wherein the formatting is a font size.

5. The method of claim 1 wherein the user input is a mouse-over.

6. The method of claim 1 wherein the user input is a touch on a touch screen.

7. The method of claim 1 wherein the changing of the indication of the confidence score displays a thumb icon.

8. The method of claim 7 wherein the thumb icon is a thumb up icon.

9. The method of claim 1 further comprising accepting a user indication of the acceptance of the confidence score.

10. The method of claim 9 further comprising changing the display screen to reflect that the confidence score has been accepted.

11. An apparatus for visualization of a machine learning confidence score, the apparatus comprising:
    a display screen;
    a special purpose computer electrically connected to the display screen;
    a large capacity data storage facility with a machine learning training data set;
    a user interface display algorithm operates on the special purpose computer and displays an indication of the machine learning confidence score on the display screen;
    a natural language processing algorithm operates on the special purpose computer and interfaces with the user interface display algorithm to convert a textual description into a table of word stems;
    a machine learning algorithm operates on the special purpose computer and interfaces with the natural language processing algorithm to convert the table of the word stems into the machine learning confidence score using a machine learning model built using the machine learning training data set;
    a scan back algorithm operates on the special purpose computer and interfaces to the machine learning algorithm to insert format instructions into the textual description using the table of word stems to format at least one word in the textual description that impacted the machine learning confidence score; and
    a user interface input algorithm operates on the special purpose computer and interfaces with the scan back algorithm to display the textual description with the format instructions and to accept user input regarding the machine learning confidence score and to add the user input to the machine learning training data set, wherein the textual description with the format instructions is only displayed on the display screen when a mouse location is over a variable icon that varies depending on a magnitude of the machine learning confidence score.

12. The apparatus of claim 11 wherein the format instructions bold a portion of the textual description.

13. The apparatus of claim 11 wherein the format instructions increase a font on a portion of the textual description.

14. The apparatus of claim 11 wherein the indication of the machine learning confidence score on the display screen is in a form of the variable icon that varies depending on the magnitude of the machine learning confidence score.

15. The apparatus of claim 14 wherein the variable icon displays a different number of items depending upon the magnitude of the machine learning confidence score.

16. The apparatus of claim 15 wherein the variable icon displays three rays off of a lightbulb based on one range of the confidence score, and one ray off of the lightbulb based on another range of the machine learning confidence score.

17. The apparatus of claim 11 wherein the user input modifies the machine learning model in real time.

18. A special purpose computer implemented method of visualizing a machine learning confidence score, the method comprising:
- displaying an indication of the machine learning confidence score on a display screen along with a narrative section;
- detecting that a mouse location is over the indication of the machine learning confidence score on the display screen;
- changing the indication of the machine learning confidence score based on the mouse over the indication of the machine learning confidence score; and
- changing formatting of the narrative section based on the mouse over the indication of the machine learning confidence score.

19. The method of claim 18 wherein the indication of the machine learning confidence score is a light bulb icon.

20. The method of claim 19 wherein the light bulb icon varies a number of rays with the light bulb icon based on the machine learning confidence score.

\* \* \* \* \*